(12) United States Patent
Tong et al.

(10) Patent No.: US 8,598,979 B2
(45) Date of Patent: *Dec. 3, 2013

(54) KEYBOARD

(75) Inventors: Song-Lin Tong, Shenzhen (CN);
Hai-Qing Zhou, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 704 days.

This patent is subject to a terminal disclaimer.

(21) Appl. No.: 12/785,425

(22) Filed: May 21, 2010

(65) Prior Publication Data

US 2011/0273289 A1    Nov. 10, 2011

(30) Foreign Application Priority Data

May 5, 2010   (CN) .......................... 2010 1 0163276

(51) Int. Cl.
*G08B 21/00*      (2006.01)
*G06F 21/32*      (2013.01)

(52) U.S. Cl.
USPC ....... 340/5.52; 340/5.53; 340/5.82; 340/5.83; 341/22; 345/168

(58) Field of Classification Search
USPC .......... 340/5.82, 5.83, 5.52, 5.53; 341/20–22; 382/124–127; 713/186, 300, 310; 345/168

See application file for complete search history.

(56) References Cited

U.S. PATENT DOCUMENTS

| | | | |
|---|---|---|---|
| 5,559,504 A * | 9/1996 | Itsumi et al. ................. 340/5.53 |
| 5,767,844 A * | 6/1998 | Stoye ............................ 345/212 |
| 5,892,503 A * | 4/1999 | Kim ............................. 345/168 |
| 8,253,530 B2 * | 8/2012 | Zhou ............................ 340/5.51 |
| 2002/0024504 A1 * | 2/2002 | Kao et al. ..................... 345/168 |
| 2003/0011496 A1 * | 1/2003 | Yu ................................. 341/23 |
| 2004/0075590 A1 * | 4/2004 | Pearson ......................... 341/22 |

* cited by examiner

*Primary Examiner* — Edwin Holloway, III
(74) *Attorney, Agent, or Firm* — Altis Law Group, Inc.

(57) ABSTRACT

A keyboard includes a fingerprint input unit, a storage unit, a switch unit, and a control unit. The fingerprint input unit receives fingerprint information of a user. The storage unit stores a fingerprint model. The control unit is connected to the fingerprint input unit, the storage unit, and the switch unit. The control unit receives the fingerprint information of the user from the fingerprint input unit and compares the received fingerprint information with the fingerprint model stored in the storage unit. If the received fingerprint information is consistent with the fingerprint model, the control unit controls the switch unit to be turned on, to output a control signal to power on a computer connected to the keyboard.

8 Claims, 3 Drawing Sheets

KEYBOARD

BACKGROUND

1. Technical Field

The present disclosure relates to keyboards, and particularly to a keyboard which can power-on a computer.

2. Description of Related Art

A keyboard as an input device for a computer is well known. Most improvements to the keyboard are for ergonomics or making the inside of the keyboard dust-proof or other such non-computer related functionality. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure accompanying with the drawings is illustrated by way of example. It should be noted that references to "an" or "one" embodiment in this disclosure are not necessarily to the same embodiment, and such references mean at least one.

Figure 1:
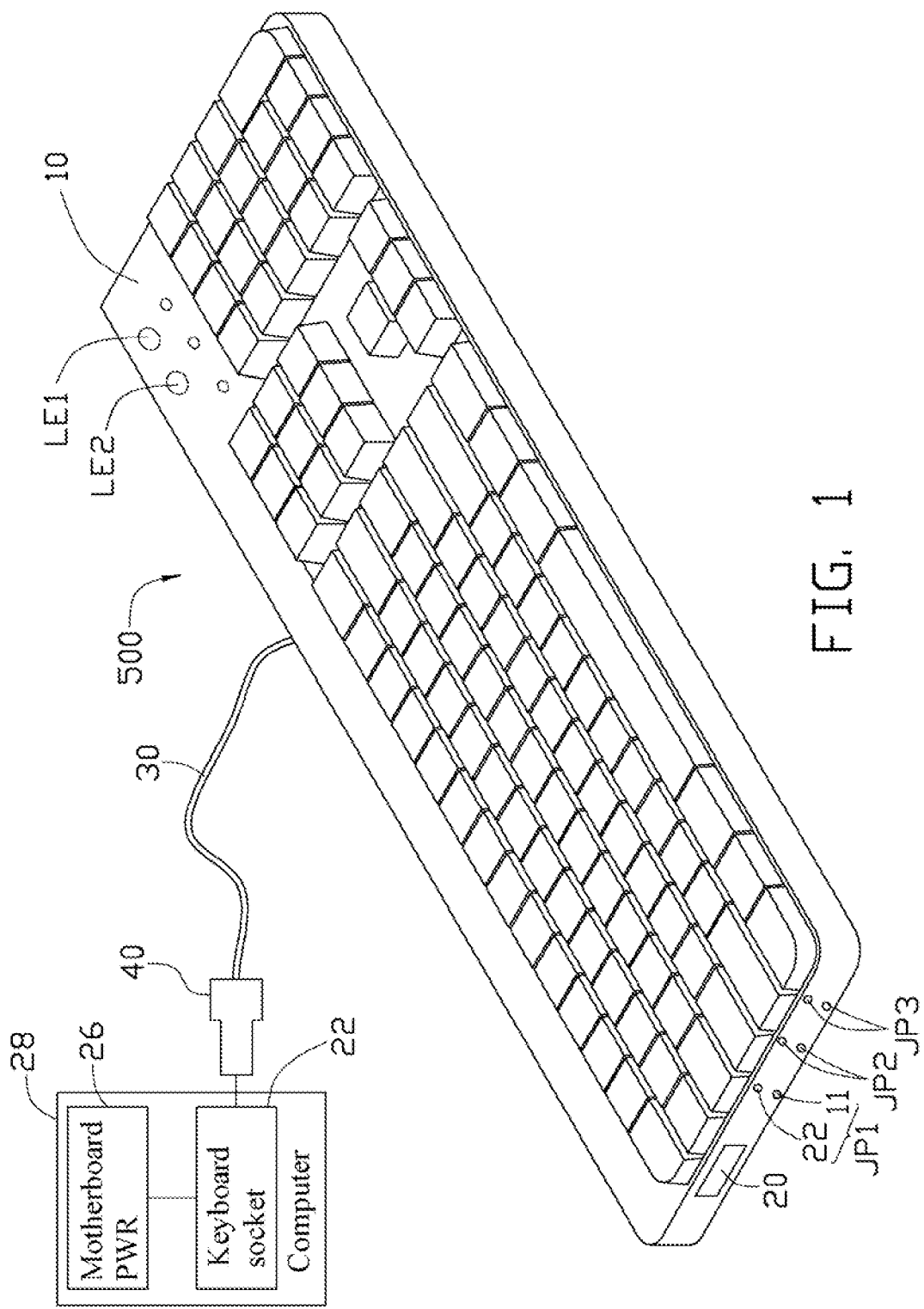
FIG. 1 is a schematic, isometric view of an exemplary embodiment of a keyboard and a computer.
Figure 2:
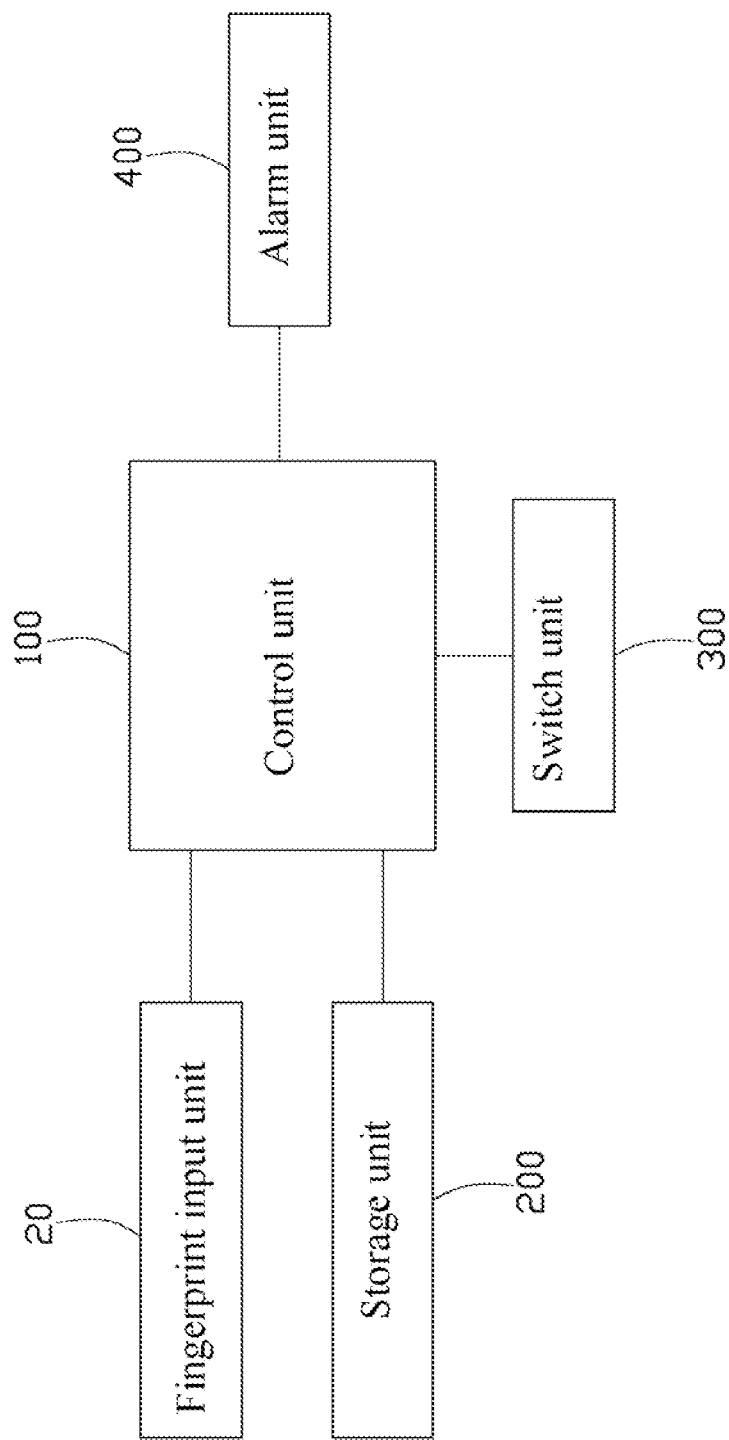
FIG. 2 is a block diagram of the keyboard of FIG. 1.

Referring to FIGS. 1 and 2, an exemplary embodiment of a keyboard 500 includes a housing 10, a fingerprint input unit 20 arranged on the housing 10, and a control unit 100, a storage unit 200, a switch unit 300, and an alarm unit 400 arranged in the housing 10. The finger input unit 20, the storage unit 200, the switch unit 300, and the alarm unit 400 are all connected to the control unit 100.

The fingerprint input unit 20 receives fingerprint information of a user of the keyboard 500. The control unit 100 receives the fingerprint information from the fingerprint input unit 20 and generates a fingerprint model according to the received fingerprint information, and stores the fingerprint model in the storage unit 200. When a computer 28 connected to the keyboard 500 needs to be powered on, the user touches the fingerprint input unit 20 and the fingerprint input unit 20 reads the fingerprint information of the user. The control unit 100 receives the fingerprint information of the user from the fingerprint input unit 20 and compares the received fingerprint information with the fingerprint model stored in the storage unit 200. If the received fingerprint information is consistent with the fingerprint model, the control unit 100 controls the switch unit 300 to be turned on to output a control signal to power on the computer 28. The alarm unit 400 displays the states of the computer 28. The keyboard 500 is connected to the computer 28 by a keyboard cable 30. One pin of the keyboard cable 30 is connected to an idle pin of a keyboard socket 22 of a motherboard 26 of the computer 28, and the idle pin of the keyboard socket 22 is connected to a control terminal PWR of the motherboard 26.

Figure 3:
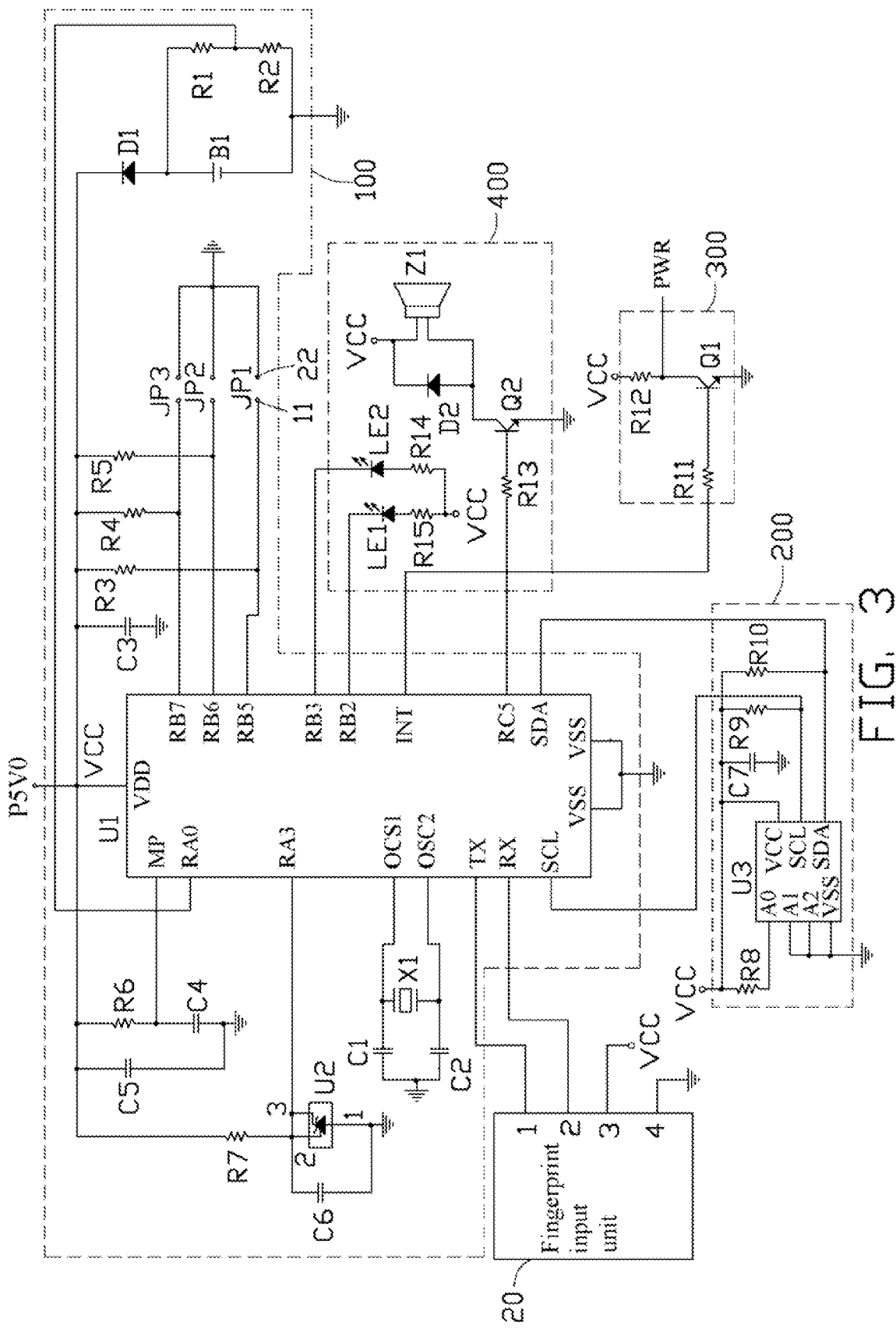
FIG. 3 is a circuit diagram of the keyboard of FIG. 2.

Referring to FIG. 3, the control unit 100 includes a microcontroller U1, a battery B1, a diode D1, a crystal oscillator X1, jumper pins JP1-JP3, resistors R1-R7, capacitors C1-C6, and a regulator U2. The regulator U2 provides a reference voltage to the microcontroller U1. Each jumper pin includes two pins 11 and 22. A first clock pin OCS1 of the microcontroller U1 is grounded via the capacitor C1. A second clock pin OSC2 of the microcontroller U1 is grounded via the capacitor C2. The crystal oscillator X1 is connected between the first and second clock pins OCS1 and OSC2 of the microcontroller U1. An input and output (I/O) pin RB5 of the microcontroller U1 is connected to the pin 11 of the jumper pin JP1. The pin 22 of the jumper pin JP1 is grounded. An I/O pin RB6 of the microcontroller U1 is connected to the pin 11 of the jumper pin JP2. The pin 22 of the jumper pin JP2 is grounded. An I/O pin RB7 of the microcontroller U1 is connected to the pin 11 of the jumper pin JP3. The pin 22 of the jumper pin JP3 is grounded. The I/O pin RB5 of the microcontroller U1 is also connected to a cathode of the diode D1 and a voltage pin VDD of the microcontroller U1 via the resistor R3. The resistor R4 is connected between the cathode of the diode D1 and the I/O pin RB7 of the microcontroller U1. The resistor R5 is connected between the cathode of the diode D1 and the I/O pin RB6 of the microcontroller U1. An anode of the diode D1 is connected to a positive pole of the battery B1. A negative pole of the battery B1 is grounded. The resistor R1 is connected between the positive pole of the battery B1 and an I/O pin RA0 of the microcontroller U1. The resistor R2 is connected between the I/O pin RA0 of the microcontroller U1 and ground. The voltage pin VDD of the microcontroller U1 is connected to a power source P5V0. A ground pin VSS of the microcontroller U1 is grounded. The capacitor C3 is connected between the voltage pin VDD of the microcontroller U1 and ground. An I/O pin MP of the microcontroller U1 is connected to the voltage pin VDD of the microcontroller U1 via the resistor R6 and is also grounded via the capacitor C4. The voltage pin VDD of the microcontroller U1 is connected to a reference terminal 2 of the regulator U2 and an I/O pin RA3 of the microcontroller U1 via the resistor R7. A cathode 3 of the regulator U2 is connected to the I/O pin RA3 of the microcontroller U1. An anode 1 of the regulator U2 is grounded. The capacitor C6 is connected between the reference terminal 2 of the regulator U2 and ground. A first terminal of the capacitor C5 is connected to a node between the resistors R6 and R7, and a second terminal of the capacitor C5 is grounded. The jumper pins JP1-JP3 are arranged on the housing 10.

The fingerprint input unit 20 includes a transmitting terminal 1, a receiving terminal 2, a voltage terminal 3, and a ground terminal 4. The transmitting terminal 1 is connected to a transmitting pin TX of the microcontroller U1. The receiving terminal 2 is connected to a receiving pin RX of the microcontroller U1. The voltage terminal 3 is connected to the power source P5V0. The ground terminal 4 is grounded.

The storage unit 200 includes a storage chip U3, resistors R8-R10, and a capacitor C7. A voltage terminal A0 of the storage chip U3 is connected to the power source P5V0 via the resistor R8. A voltage terminal VCC of the storage chip U3 is connected to the power source P5V0 and is also grounded via the capacitor C7. A clock terminal SCL of the storage chip U3 is connected to the voltage terminal VCC of the storage chip U3 via the resistor R9, and is also connected to a clock pin SCL of the microcontroller U1. A data terminal SDA of the storage chip U3 is connected to the voltage terminal VCC of the storage chip U3 via the resistor R10, and is also connected to a data pin SDA of the microcontroller U1. A ground terminal VSS of the storage chip U3 is grounded. In one embodiment, the storage chip U3 may be an electrically erasable programmable read only memory (EEPROM). In other embodiments, the storage chip U3 can be other types of storage chips.

The switch unit 300 includes a transistor Q1 and two resistors R11 and R12. A base of the transistor Q1 is connected to an interrupt pin INT of the microcontroller U1 via the resistor R11. An emitter of the transistor Q1 is grounded. A collector of the transistor Q1 is connected to the power source P5V0 via the resistor R12, and is also connected to an idle pin of a keyboard plug 40 connected to the keyboard cable 30. When the keyboard plug 40 is plugged in the keyboard socket 22 of the motherboard 26, the idle pin of the keyboard plug 40 is electrically connected to the control terminal PWR of the motherboard 26 of the computer 28. In one embodiment, the transistor Q1 functioning as an electronic switch is an npn transistor. In other embodiments, the transistor Q1 can be other types of electronic switches, such as an n-channel metal oxide semiconductor field effect transistor (NMOSFET).

The alarm unit 400 includes a transistor Q2, a diode D2, a buzzer Z1, two light emitting diodes (LEDs) LE1 and LE2, and three resistors R13-R15. A base of the transistor Q2 is connected to an output pin RC5 of the microcontroller U1 via the resistor R13. An emitter of the transistor Q2 is grounded. A collector of the transistor Q2 is connected to an anode of the diode D2. A cathode of the diode D2 is connected to the power source P5V0. The buzzer Z1 is connected between the anode and the cathode of the diode D2. Cathodes of the LEDs LE1 and LE2 are connected to output pins RB2 and RB3 of the microcontroller U1, respectively. Anodes of the LEDs LE1 and LE2 are connected to the power source P5V0 via the resistors R15 and R14, respectively. The LEDs LE1 and LE2 are arranged on the housing 10. In one embodiment, the transistor Q2 functioning as an electronic switch is an npn transistor. In other embodiments, the transistor Q2 can be other types of electronic switches, such as an NMOSFET.

The following depicts how the keyboard 500 powers on the computer 28. When the control terminal PWR of the computer 28 receives a low level voltage (e.g., 0V) and the current state of the computer 28 is in a powered off state, the computer 28 will be powered on. When the control terminal PWR receives a high level voltage (e.g., 3V), the computer 28 will remain in the current state.

Before the computer 28 is used, a plurality of jumpers (not shown) are selectively connected to one of the jumper pins JP1-JP3, to record fingerprint information of different users. In one embodiment, the number of the user is seven. When the jumpers are disconnected from the jumper pins JP1-JP3, all the I/O pins RB5-RB7 of the microcontroller U1 receive a high level signal (e.g. 3 volts). When the jumpers are connected to the jumper pins JP1-JP3, all the I/O pins RB5-RB7 of the microcontroller U1 receive a low level signal (e.g. 0 volts). The fingerprint input unit 20 capable of recording fingerprint information of users according to the voltage level of the I/O pins RB5, RB6, and RB7 of the microcontroller U1 is shown in the table below. In the table, "0" stands for the I/O pin being low voltage level when the jumper is connected to the jumper pin, and "1" stands for the I/O pin being high voltage level when the jumper is not connected to the jumper pin.

| | Voltage level of RB5-RB6-RB7 | | | | | | | |
|---|---|---|---|---|---|---|---|---|
| | 000 | 001 | 010 | 011 | 100 | 101 | 110 | 111 |
| User | First user | Second user | Third user | Fourth user | Fifth user | Sixth user | Seventh user | None |

For example, the following depicts how the fingerprint information of the first user can be recorded. Firstly, three jumpers are respectively connected to the jumper pins JP1-JP3, and voltage level of RB5-RB6-RB7=000, and then the first user touches the fingerprint input unit 20, the fingerprint input unit 20 records the fingerprint information of the first user and sends the recorded fingerprint information to the microcontroller U1. The microcontroller U1 receives the fingerprint information and generates a fingerprint model according to the received fingerprint information, and stores the fingerprint model in the storage chip U3. Thus, the fingerprint information of the first user is recorded successfully. Recording fingerprint information of other users is done in similar way.

When the computer 28 needs to be powered on, the user touches the fingerprint input unit 20, and the fingerprint input unit 20 reads the fingerprint information of the user and sends the fingerprint information to the microcontroller U1. The microcontroller U1 compares the received fingerprint information with the fingerprint model stored in the storage chip U3. If the received fingerprint information is not consistent with the fingerprint model, the output pin RB2 of the microcontroller U1 outputs a low level signal, such as 0 volts (V), the LED LE1 is turned on and emits light, such as red light, to indicate that the user is not authorized to use the computer 28, and that it will not be powered on. If the received fingerprint information is consistent with the fingerprint model, the interrupt pin INT of the microcontroller U1 outputs a high level signal, such as 3V, the transistor Q1 is turned on, the collector of the transistor Q1 outputs a low level signal, such as 0V, to the control terminal PWR of the motherboard 26, to power the computer 28 on. After the computer is powered on, the output terminal RB3 of the microcontroller U1 outputs a low level signal, the LED LE2 is turned on and emits light, such as green light, to indicate that the computer 28 is powered on normally. The power source P5V0 is a system power source of the computer 28, and will provide power during the computer 28 is in the powered on state, the diode D1 is turned off, and the battery B1 does not provide power to the microcontroller U1, thereby saving electricity of the battery B1. In other embodiments, the battery B1 may be a rechargeable battery and the system power source P5V0 recharges the battery B1 when the computer 28 is in the powered on state.

The keyboard 10 can also detect electricity of the battery B1. When the battery B1 is at a low level, such as 5.7V, a voltage of the node between the resistors R1 and R2 drops below a certain value, such as 5V, the microcontroller U1 detects a voltage at the I/O pin RA0 is less than a certain value, such as 5V. The output pin RC5 of the microcontroller U1 is at a high level, such as 3V, the transistor Q2 is turned on. The anode of the diode D2 is at a low level, such as 0V, the diode D2 is turned off, and the buzzer Z1 outputs a sound. In other embodiments, the output pin RC5 of the microcontroller U1 can output a pulse signal when the battery B1 is at a low level, such as 5.7V, as a result, the buzzer Z1 can output a repeated short sound to indicate that the battery B1 needs to be replaced or be recharged The keyboard 10 can power the computer 28 on by touching the fingerprint input unit 20, which is set on the keyboard 10, to power the computer on conveniently.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A keyboard comprising:
a fingerprint input unit to receive fingerprint information of a user;
a storage unit storing a fingerprint model;
a switch unit;
a control unit connected to the fingerprint input unit, the storage unit, and the switch unit, wherein the control unit receives the fingerprint information of the user from the fingerprint input unit and compares the received fingerprint information with the fingerprint model stored in the storage unit, upon a condition that the received fingerprint information being consistent with the fingerprint model, the control unit controls the switch unit to be turned on, to output a control signal to power on a computer connected to the keyboard, wherein the control unit comprises a microcontroller, a battery, a first diode, a first resistor, and a second resistor, a voltage pin of the microcontroller is connected to a power source and a cathode of the first diode, an anode of the first diode is connected to a positive pole of the battery, a negative pole of the battery is grounded, the first resistor is connected between the positive pole of the battery and a first input and output (I/O) pin of the microcontroller, the second resistor is connected between the first I/O pin of the microcontroller and ground, a ground pin of the microcontroller is grounded, and
an alarm unit comprising a transistor, a second diode, and a buzzer, a base of the transistor is connected to a first output pin of the microcontroller, an emitter of the transistor is grounded, a collector of the transistor is connected to an anode of the second diode, a cathode of the second diode is connected to the power source, the buzzer is connected between the anode and the cathode of the second diode;
wherein when the battery is at a low level, a voltage of the node between the first and second resistors drops below a certain value, the microcontroller detects a voltage at the first I/O pin is less than a certain value, the first output pin of the microcontroller is at a high level, the transistor is turned on, the anode of the second diode is at a low level, the second diode is turned off, and the buzzer outputs a sound, to indicate a charge of the battery.

2. The keyboard of claim 1, wherein the control unit receives the fingerprint information from the fingerprint input unit and generates the fingerprint model according to the received fingerprint information.

3. The keyboard of claim 1, wherein the control unit further comprises three jumper pins and third to fifth resistors, each jumper pin comprises first and second pins, a second I/O pin of the microcontroller is connected to the first pin of the first jumper pin, a third I/O pin of the microcontroller is connected to the first pin of the second jumper pin, a fourth I/O pin of the microcontroller is connected to the first pin of the third jumper pin, the second pins of the first to third jumper pins are grounded, the third resistor is connected between the cathode of the first diode and the second I/O pin of the microcontroller, the fourth resistor is connected between the cathode of the first diode and the fourth I/O pin of the microcontroller, the fifth resistor is connected between the cathode of the first diode and the third I/O pin of the microcontroller.

4. The keyboard of claim 1, wherein the storage unit comprises a storage chip, first and second voltage pins of the storage chip are connected to the power source, a clock pin of the storage chip is connected to the second voltage pin of the storage chip and a clock pin of the microcontroller, a data pin of the storage chip is connected to the second voltage pin of the storage chip and a data pin of the microcontroller, a ground pin of the storage chip is grounded.

5. The keyboard of claim 4, wherein the storage unit further comprises a first capacitor and third to fifth resistors, the first capacitor is connected between the second voltage pin of the storage chip and ground, the third resistor is connected between the first voltage pin of the storage chip and the power source, the fourth resistor is connected between the clock pin and the second voltage pin of the storage chip, the fifth resistor is connected between the data pin and the second voltage pin of the storage chip.

6. The keyboard of claim 1, wherein the switch unit comprises a transistor and a third resistor, a base of the transistor is connected to an interrupt pin of the microcontroller, an emitter of the transistor is grounded, a collector of the transistor is connected to the power source via the third resistor and is also connected to a control terminal of a motherboard of the computer.

7. The keyboard of claim 1, wherein the alarm unit further comprises first and second light emitting diodes (LEDs), a cathode of the first LED is connected to a second output pin of the microcontroller, a cathode of the second LED is connected to a third output pin of the microcontroller, anodes of the first and second LEDs are connected to the power source.

8. The keyboard of claim 7, wherein the alarm unit further comprises third to fifth resistors, the third resistor is connected between the base of the transistor and the first output pin of the microcontroller, the fourth resistor is connected between the anode of the first LED and the power source, the fifth resistor is connected between the anode of the second LED and the power source.

* * * * *